Feb. 28, 1928.

F. H. HOPKINS

COMPOUND RELIEF VALVE

Filed Aug. 1, 1922

Inventor
Frank H. Hopkins.
By Wight, Brown, Quinby & Hay
Attys.

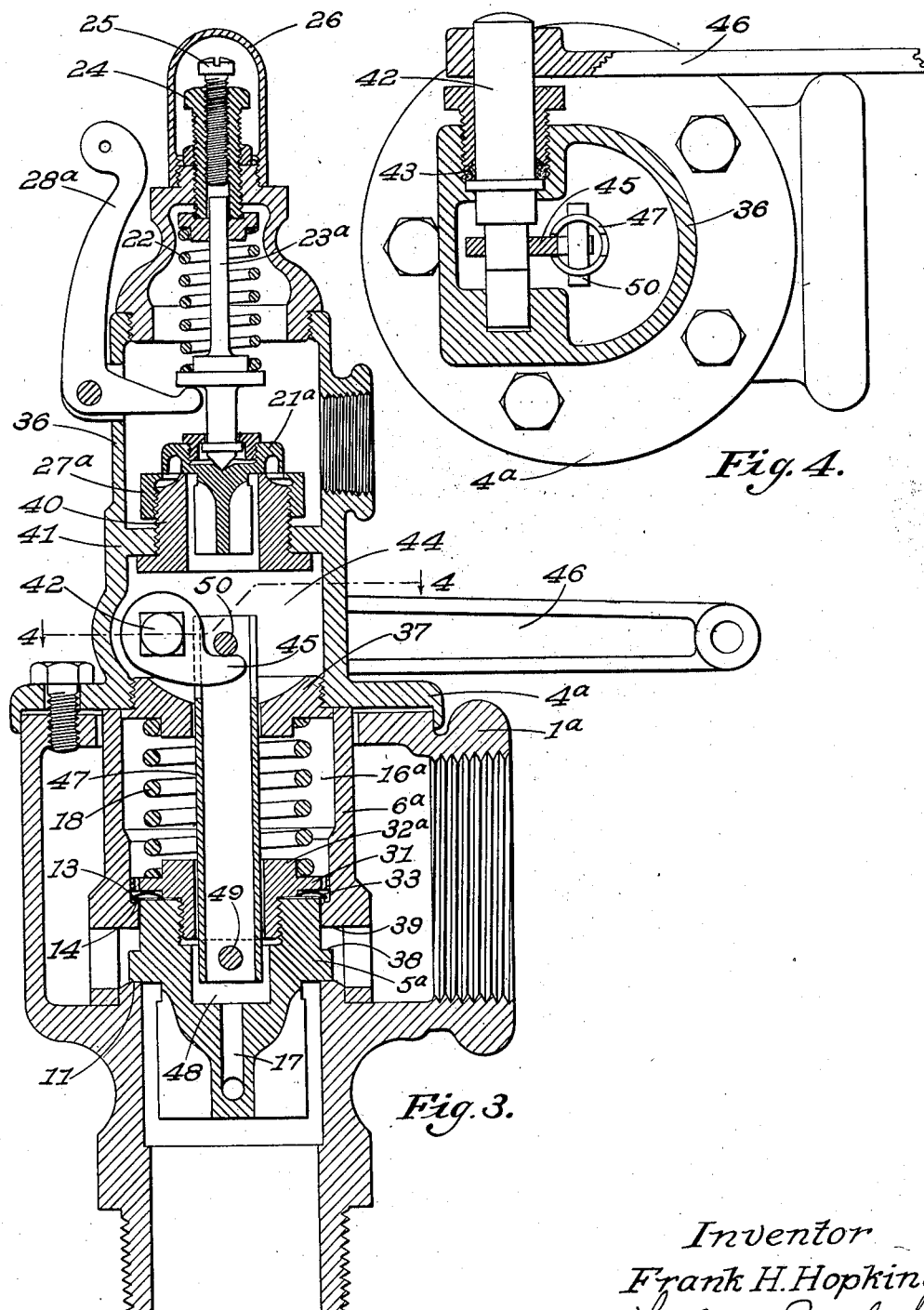

Patented Feb. 28, 1928.

1,660,382

UNITED STATES PATENT OFFICE.

FRANK H. HOPKINS, OF SOMERVILLE, MASSACHUSETTS, ASSIGNOR, BY MESNE ASSIGNMENTS, TO AMERICAN SCHAEFFER & BUDENBERG CORPORATION, OF BROOKLYN, NEW YORK, A CORPORATION OF NEW YORK.

COMPOUND RELIEF VALVE.

Application filed August 1, 1922. Serial No. 578,910.

The present invention relates to safety valves and other analogous appliances for relieving excess pressure of fluids confined in containers; such as steam in a steam boiler, any other vapor or gas in a closed tank, or water or other liquid in a pipe line or other container of any sort.

The objects include, among others, that of insuring such a wide opening of the main valve, when relief of the pressure occurs, as will avoid the objectionable action of fluttering, sizzling, wire drawing, and so forth; that of causing a more rapid discharge of the fluid when relief takes place than is possible with pop valves of the same size; and those of regulating the length of time required for the main valve to open fully, of regulating the amount of blow back or lowering of pressure which will take place before the main valve again becomes seated, and of regulating the speed of the closing movement of the valve. These objects are accomplished by uniting in one relief valve combination, a main valve which is so subjected to the pressure existing in the boiler, or equivalent container, that such pressure tends to hold it closed, with an auxiliary or primary valve arranged to relieve the pressure so acting when the pressure in the container rises to the degree at which it is determined that relief shall occur, and with other devices and means useful for these and other purposes.

It is in a valve having means of the character above indicated for accomplishing the objects above named and other objects, that this invention consists. The exact nature of the invention can best be explained in connection with a detailed description of specific embodiments thereof given in the following specification in connection with drawings illustrating such embodiments.

In the drawings

Figure 3 is a view similar to Figure 1 of another form of such valve.

Figure 4 is a cross section on line 4—4 of Figure 3.

Like reference characters represent the same parts wherever they occur in all the figures.

Figures 1, 2:
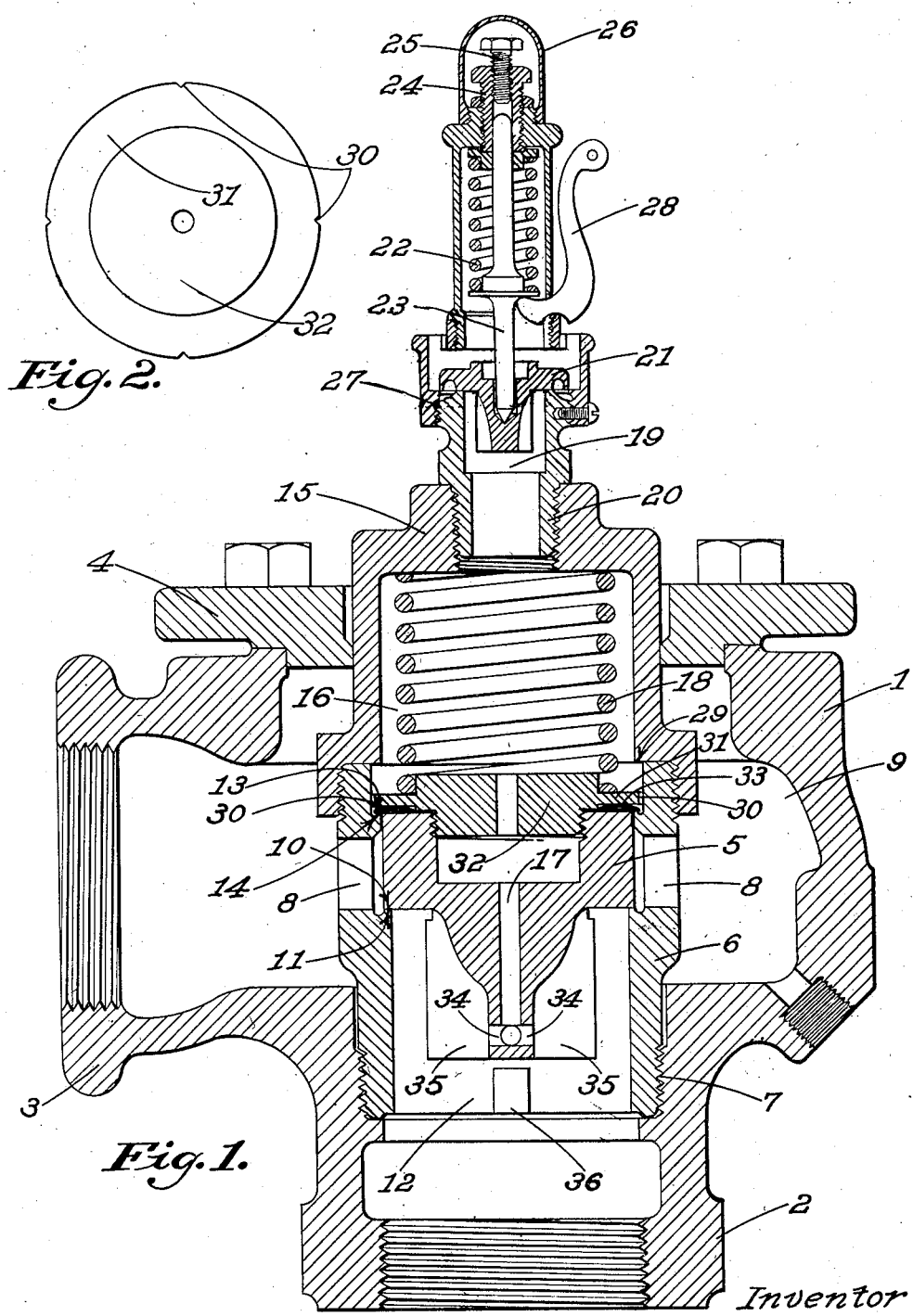
Figure 1 is an axial section of one form of compound relief embodying the invention.
Figure 2 is a plan of the main valve proper.

I will first describe the form shown in Figures 1 and 2, and explain the purposes and action of the invention in connection with that description, before taking up the modifications shown in Figures 3 and 4.

The casing or body 1 is conveniently and economically made of cast iron, although any other suitable material may be employed, having a nipple 2 for connection in any suitable way with a steam boiler or other container of fluid under pressure, and a second nipple 3 for discharge of the excess fluid when relief occurs. These nipples are shown as being internally threaded to illustrate means whereby one may be connected by a pipe section, or coupling of any sort, with a boiler, and by which the other may be connected with a pipe for conducting the discharged fluid away to a suitable point. 4 is a cover plate for the valve casing, made as a separate part and attached detachably by bolts in order to permit convenient assemblage of the other parts of the valve presently described.

In the following description of use and operation I will generally refer to the container with which this valve is used as a boiler, both for the sake of brevity and because a large field of use of the invention is in connection with steam boilers. At the same time it is to be understood that I do not intend to imply any limitation in the use or in the protection which I claim for the invention in so doing, but that the word "boiler" is here intended to typify any container wherein any fluid under pressure may be confined and from which relief of the pressure may at times be necessary.

A valve member 5, which may be called for the purposes of this description the "main valve proper," is confined movably in a holder 6. The holder is essentially a tube secured by complemental screw-threads at 7 within the valve case 1, and having ports 8, 8 which open to an annular chamber 9 in the valve casing surrounding the holder and from which the outlet nipple 3 opens. The bore of the holder 7 and its ports 8, 8 thus provide the passage through the valve by which provision is made for escape of fluid to relieve the pressure in the boiler.

The main valve proper has a face 10 which cooperates with a seat 11 in the holder between the ports 8 and the entrance opening 12 of the holder, and carries a resiliently flexible flange 13 which cooperates with a seat 14 formed in the holder at the opposite side of the ports 8 from said entrance opening. A chambered cover 15 is secured, preferably by screw-threads, to the holder 6 in such a manner as to make a fluid-tight joint therewith. Except for the opening in which the primary valve is secured, as later described, this closure is fluid-tight throughout and forms an enclosed chamber 16.

Fluid under pressure from the boiler is admitted to this chamber by a passage 17 through the main valve proper and exerts force on said main valve proper tending to hold it seated against the pressure within the boiler which tends to open it. A spring 18 abutting against the end wall of the chamber also presses on the valve and tends to hold it seated. The force of the spring and of the fluid pressure acting with seating tendency, together exceed the force of the pressure outward from the boiler tending to open the valve. This excess may be made as great or as little as desired by providing a spring of suitable force and by properly proportioning the areas of the valve respectively exposed to pressures in opposite directions. I may, by making the area exposed to pressure from without enough greater than that exposed to pressure from within, depend on such excess fluid pressure alone for holding the valve in seated position, dispensing with the spring altogether. Thus, from the point of view only of the operating functions of the valve, the provision of a spring is not essential, but from other considerations it is necessary in order to hold the valve proper against its seats in shipment and so protect it at such times from injury by being knocked about. On the other hand, I may make the spring stiff enough to provide in large measure the excess force required to hold the valve proper seated, and if that is done, the area on the valve proper exposed to pressure from without need not be greater, but may even be smaller, than that exposed to pressure from within the boiler. As a practical measure the spring is made with enough stiffness to have appreciable effect in seating the valve, and the relative interior and exterior areas of the valve proper are designed with reference to the pressures with which the relief valve is to be used in service and for the amount of pressure decrease or blow back which it is intended shall take place after the main valve proper opens and before it is again closed.

From the description thus far given it will be apparent that the main valve proper will not open, no matter how high the pressure in the boiler may become, unless the pressure in the chamber 16 is first relieved. For thus relieving the pressure I provide an auxiliary or primary valve 19, which is preferably of the pop safety valve type. It embodies a nipple 20 which is screwed into an opening in the cover 15, a valve proper 21, a spring 22 acting, preferably through a spindle 23, to close the valve proper, a compression screw 24 for regulating the tension of spring 22, and a stop screw 25 for limiting the lift of the valve proper. The compression and stop screws, or equivalent adjusting members, are preferably enclosed in a protecting cap 26 which is detachable to permit access to these screws when adjustment is needed. An adjustable sleeve 27, known in the art as a "valve center" is provided for regulating in a well understood manner the amount of blow back or pressure loss which must occur before the valve will seat after being opened. A lever 28 is provided for manually opening the valve when desired.

The specific primary valve herein illustrated does not contain any departure from a standard design of pop valve except in the provision of the stop screw 25, and requires no further description of construction and function so far as it alone is concerned. The new step involved in the use of such valve, is in the combination of such valve as a primary relief for, and an auxiliary relief with, a main valve proper, and as an adjustable means for governing the speed of lift of the main valve, the amount of blow back which will occur before the main valve is again seated, and the speed of seating movement of the main valve. Therefore, so far as this combination is concerned, other forms of primary valve may be used without departure from the invention, and the particular one here shown is to be considered as illustrative of any primary relief valve which is suitable in the combination.

The principle of the compound pop relief valve, and the manner in which it operates are as follows:

Whatever the pressure in the boiler may be, an equal steam pressure is exerted in the chamber 16, owing to the by-pass passage 17 to the chamber from the boiler side of the main valve proper. The fluid pressure tending to open this valve is opposed by the pressure in the chamber, and is balanced or overbalanced or partially balanced in proportion to the ratio between the area within valve seat 14 and the area within valve seat 11. To this back, or closing, fluid pressure is added the constant pressure of the spring 18. When, in the course of rising boiler pressure, the point is reached at which the primary valve is set to open, discharge from the pressure chamber begins; and the characteristics of a pop safety valve embodied in the primary valve, cause the latter to remain open until the pressure in chamber 16 has been sufficiently reduced. Necessarily, of course, the discharge through the primary valve must be more rapid than the rate of flow through the passage 17 in order that such reduction may occur. The main valve remains seated until the fluid pressure in chamber 16 has diminished to the point where that pressure, plus the force of the spring, is less than the outward pressure from the boiler. Then the main valve leaves its seat and passes to fully open position, where it is arrested by a shoulder or equivalent stop means 29, which is also a seat complemental to the valve proper to prevent leakage from chamber 16 when the valve is fully open. Discharge of the fluid now takes place past the main valve proper, while continuing past the primary valve. The pressure in the boiler and that in the chamber 16 diminish together and with maintenance of approximately the same differential between them. Finally when the pressure in the chamber 16 has been blown down to a degree insufficient to hold the primary valve open, such valve closes, and then pressure builds up in the chamber and closes the main valve.

As an example, let it be assumed that the boiler is to be relieved when the pressure reaches 100 pounds and such pressure is to be reduced to 97 pounds when relief occurs; also that the main valve will remain closed until the steam pressure in chamber 16 has dropped to 80 pounds. Under these conditions the primary valve is set to open at 100 pounds and to blow back 23 pounds before closing. The 20 pound reduction in chamber 16 before the main valve proper opens will take place quickly, owing to the small volume of this chamber, and the small area of by-pass 17, while the final 3 pound reduction to 77 pounds in the chamber will be accomplished slowly and while the boiler pressure is diminishing from 100 to 97 pounds, mainly from the principal outlet, but in part also through the by-pass and auxiliary valve.

By appropriately adjusting the spring of the primary valve, the pressure at which relief will occur may be regulated; by adjusting the outer ring 27 the amount of blow back of the boiler may be regulated; and by adjusting the lift of the primary valve proper by the stop screw 25, the time taken up by the main valve proper in lifting to the full extent is regulated. This last regulation primarily governs the discharge past the primary valve proper, and according as this discharge is much or little greater than the flow through the by-pass 17, the rise of such main valve is relatively rapid or slow.

The rapidity of both opening and closing of the main valve proper is controlled also by providing more or less clearance between the vlave and the surrounding walls of the holder 6 in the space between seat 14 and stop shoulder 29. Such clearance permits a more or less restricted outflow of steam from chamber 16 to the ports 8, causing quicker relief of the chamber than that due to the primary valve alone when the main valve is opening, and causing the building up of pressure in the chamber, after the primary valve has closed, to be retarded while the main valve is closing. To provide this clearance and at the same time maintain the desired close fit of the valve in the holder, notches 30 are cut in the flange 31 of the main valve proper to a less depth than the overlap of said flange over the seats 14 and 29. Thus the notches are covered when the valve is either wholly open or wholly closed, and do not allow steam to flow except while the valve is between the seats.

Even without the provisions just described for retarding its closing movement, the main valve would come gradually to its seat without shock, owing to the action of the primary valve when closing. This valve, being of the pop type, entraps steam in its huddling chamber, when, in course of seating, the flange of its valve proper passes within the valve center 27. Its seating movement is thus retardded while it still permits restricted escape of steam, and the escape of steam then occurring retards building up of pressure in chamber 16 in such measure that there is no sudden and violent closing of the main valve.

In comparison with the ordinary safety valve or relief valve, my combined valve has various advantages including the following:

(1) The resistance to lifting of the main valve under working conditions remains substantially constant until discharge from the primary valve at the predetermined pressure-relief setting occurs. This is due to the fluid back pressure being maintained always in proportion to the boiler pressure and it avoids the preliminary slight lifting, sizzling, fluttering and chattering (collectively called "warning") which occurs with ordinary safety valves when the pressure is almost at the blow off point, but not quite enough to lift the valve.

(2) When the discharge begins the main valve proper does not lift until a predetermined pressure drop, or blow back has occurred in the back pressure chamber 16, and then the lifting movement occurs continuously to the full opening. This avoids wire drawing which, in the case of steam, has a rapid effect in cutting away the valve seat and the complemental surface of the valve.

(3) The main valve proper may be made to lift up to the full capacity of the passage in which it is seated, or to any part of the capacity of this passage, by properly establishing the distance of the stop 29 from the closed position of the valve. This results in a more rapid relief of the pressure excess than can be given with a single valve of pop safety valve construction, other things being equal.

(4) The main valve proper when once opened remains in its fully opened position until returned to its seat, thus eliminating fluttering and rattling which are objectionable features of pop safety valves when set to give the widest opening and most rapid discharge possible.

(5) When seating, the main valve proper approaches its seat with a gradually retarded motion, and arrives there without shock. Sudden striking of a valve body on its seat deforms the metal and eventually results in leakage. Tests of my valve have proved that it seats without shock even when its lift is great enough to make an opening equal to half the inlet capacity of the nipple 2.

(6) In the primary valve the objectionable effects of fluttering, sizzling, wire drawing, and so forth incidental to pop safety valves are greatly lessened because this valve is of relatively small discharge capacity in comparison with the volume of the boiler (being less than enough in itself to relieve the boiler when need of relief arises), wherefore when the pressure in the boiler reaches the point at which relief is necessary, the primary valve will usually be fully opened at once. Then the inconvenience and expense of such renewals as may be necessary on account of wire drawing, and the noise due to fluttering and sizzling of the primary valve, are inappreciable in comparison with a directly operated valve of equivalent capacity to the main valve proper.

(7) This combined valve contains two distinct discharge outlets or openings, both effective at the same time to relieve pressure in the container to which the valve is applied. The valve proper controlling the larger opening follows the opening and closing of the smaller valve proper, and the combination has all the features of a pop valve in being able to open promptly and to blow back any desired amount before closing. The blow back may be as close as one pound per square inch of pressure; that is, the difference between the pressure at which the valve opens and the pressure at which it afterwards closes may be as small as one pound, and the main valve will still rise to its full lift.

The valve lip 13 and complemental face 14 are provided for the obvious purpose of preventing loss of pressure from the back pressure chamber when the valve is closed. Since it is not possible, or at least not mechanically feasible, to maintain tight closing contact of two rigidly connected valve faces on two rigidly connected seats under the conditions of unequal expansion which occur when the valve is applied to uses where different temperatures are encountered, I have made the valve face or lip 13 of resiliently yielding construction. As here shown, it is a flat annular disk of phosphor-bronze, or equivalent material for the purpose of this apparatus clamped to the body part of the main valve proper by a separable part of such valve proper, comprised by a plug 32 which is screwed into a threaded socket in such body part. It is thin enough to be flexible, for instance, one one-hundredth of an inch in thickness, and its outer rim overlaps the seat 14. The peripheral part of said clamp plug forms the flange 31, previously mentioned, and said flange is cut away on its under side to leave a narrow annular space. In this space is placed a flexible dished washer 33 which is confined by flange 31 so that it presses with considerable force on disk 13 toward the seat. The distance between disk 13 and the lower seating face 10 of the valve is slightly less than the distance apart of the seats 11 and 14, enough so as to avoid separation of the disk from seat 14 by excessive expansion of the valve proper or excessive contraction of the holder 6, under the range of temperature changes to which the valve will be subjected. Hence, when the valve closes, disk 13 will seat first, and then yield while face 10 seats, all the while maintaining close contact with seat 14. The outer edge of disk 13 overlaps a narrow groove, which surrounds the seat, and the pressure of the spring washer 33 is applied to this outer edge. Steam pressure acts with the washer to hold the disk tightly on its seat. Thus, both valve faces will be kept tightly closed, whatever may be the variations due to heat expansion.

Further describing details of construction not previously mentioned, it will be noted that in the clamp plug 32 is a passage which in effect, is a part of the passage 17. It will also be noted that the lower or entrance end of the passage 17, instead of opening straight through the lower end of the main valve proper, has lateral orifices 34 directed toward the sides of the passage. This construction is provided to baffle the flow of the fluid and prevent the addition of a velocity effect to the pressure effect in the chamber 16 after discharge through the primary valve has commenced. For the most accurate government of the valve, it is necessary that the pressure effect on the primary valve proper should be a static mode of pressure. Such static effect is substantially maintained by so baffling the flow through the passage from the boiler to the back pressure chamber, in the manner shown, or otherwise, if desired, that there will not be added upon the primary valve the kinetic effect of a jet of fluid, at high velocity impinging on the primary valve proper.

The members 35 represent guide wings of common form and well known purpose provided on the main valve proper. 36 is a lug, which may be one of several, provided on the inner wall of the tubular holder 6 for aiding in screwing said holder home in the valve casing.

In Figures 3 and 4 is shown a form of valve embodying the same principles and operating in the same way as previously described, but containing modifications in detail and an added feature.

The modifications are as follows: The primary valve casing 36 is part of the cover 4ª of the main valve casing 1ª, and the holder 6ª is clamped between this cover and the bottom of the main casing. A partition 37 is screwed into the casing 36 and serves as the abutment for spring 18. The areas and internal diameters of the main valve seats 11 and 14 are equal to one another, wherefore, so far as fluid pressures are concerned, the main valve proper is exactly balanced and the entire unbalanced seating force on this valve is applied by the spring. Advantage follows from this fact when the same design of valve is to be used with widely varying pressures, in that the seating force is constant in all circumstances, not subject to increase or diminution with changes in the fluid pressure. Then the complemental stop and seat which limit the lift of the valve, and close the lower end of the back pressure chamber when the valve is open, are provided by a ledge 38 on the valve proper and a shoulder 39 in the holder, beneath the upper valve seat. Clearance to permit escape of fluid from the back pressure chamber when the valve is closing, for retarding its closing movement, is provided by holes through the flange of the clamp plug. Such holes are permitted in this case because the seating face is in a different part of the valve proper.

The seat for the primary valve proper is formed on the end of a tube 40 which is threaded into, and tightly closed against, an inner ledge 41 within the casing 36; and the valve center 27ª is screwed upon the outside of said tube 40.

The new feature consists in a mechanical means for opening the main valve, and in the modifications needed to apply such means. A rock shaft 42 passes from the outside of the primary valve casing 36, through a stuffing box 43, into the space 44 between the partition 37 and ledge 41; and carries a short arm 45 in this chamber, and a long arm 46 on its outer end. A tube 47 passes loosely through a hole in partition 37 and through the passage in clamp plug 32ª, into a chamber 48 in the main valve proper. A pin 49 set crosswise in the lower end of this tube underlies the plug, and a pin 50, crossing the upper end of the tube, overlies arm 45, which enters a slot in the side of the tube. Hence, by raising arm 46, the main valve proper may be opened independently of its automatic action.

In this construction, the back pressure chamber is formed by the space 16ª inside holder 6ª, and the space 44, between which free course of the fluid is permitted by the looseness of tube 47 in partition 37. The by-pass passage to the back pressure chamber from the pressure side of the valve is provided by the passage 17, the bore of tube 47, and whatever looseness there may be between the tube and the clamp plug.

The modifications first described may be used without the added feature; and an equivalent valve lifting means may be embodied in the first described form of valve.

Within the scope of the invention and of the protection which I claim for it, various modifications in addition to those already indicated may be made in both construction and arrangement of the several essential elements of the combination. For instance, the back pressure chamber may be otherwise constructed and arranged than as here shown, and so also may the passage from the boiler to such chamber, and the manner in which the primary relief valve is arranged and connected thereto. The valve casing may also be otherwise formed and the escape outlet otherwise located when designed for special uses. For instance, specifically different forms of valve are provided for stationary and locomotive boilers respectively, all within the scope of my protection. Generically the passage 17 and chamber 16 (or 16ª) constitute means or provisions for applying the pressure of the fluid contained within the boiler upon the main valve proper with tendency to close it or hold it closed, and typify any means for that purpose, however arranged; while the primary valve embodies means controlled by the pressure in the boiler and acting, when such pressure exceeds a predetermined degree, to permit, not only relief of that pressure which tends to close the main valve proper, but also a continuing relief of the pressure in the container, and typifies any means for that purpose, however arranged. The main valve proper, is in principle a balanced valve and, according to the ratio of its areas exposed to pressure in opposite directions, the pressure tending to open it is counterbalanced or underbalanced, or overbalanced in greater or less excess, by the pressure which is applied with closing tendency.

What I claim and desire to secure by Letters Patent is:

1. A compound relief valve comprising a valve holder having an inlet opening for entrance of fluid under pressure from a container, said holder having also a port for discharge of said fluid and an enclosed back pressure chamber beyond said port from said inlet, said holder further having valve seats one of which is arranged between the port and the inlet and the other between the port and said chamber, combined with a valve proper having faces cooperative with said seats and provided with a by-pass passage from the entrance side of the valve to said chamber, and a primary relief valve opening from said chamber, said by-pass passage having baffling means to prevent the fluid passing therethrough from impinging as a jet upon the primary valve when discharge occurs.

2. A compound relief valve comprising a casing having a seat, a main valve proper adapted to close against said seat, a structure forming a chamber embracing a part of said valve proper and having separated seats, against which the valve proper closes alternately when closed and when opened, the valve having provisions for conducting fluid into said chamber from the pressure side of the valve proper, and a primary relief valve connected with said chamber forming structure independent of said fluid-conducting provisions, that part of the valve proper which is embraced by said chamber-forming structure having provisions to permit escape past it of the fluid in the chamber when in transit between the last-named seats.

3. A compound relief valve comprising a casing having a seat, a main valve proper adapted to close against said seat, a structure forming a chamber embracing a part of said valve proper and having separated seats, against which the valve proper closes alternately when closed and when opened, the valve having provisions for conducting fluid into said chamber from the pressure side of the valve proper, and a primary relief valve connected with said chamber-forming structure independent of said fluid-conducting provisions, that part of the valve proper which seats on the chamber-forming structure when the valve is closed, being of yielding construction.

4. In a relief valve, a valve seat, a back pressure chamber having a seat, and a valve proper arranged to close simultaneously on both said seats and exposed to oppositely acting pressures within the first named seat and in the back pressure chamber, respectively, said valve proper including a flexible disk projecting at its outer edge across the seat in said chamber, a clamp securing the central part of said disk and having a flange overlying the outer part of the disk, but spaced apart therefrom, and a dished spring washer confined in such space and bearing on the disk.

5. In a relief valve, a valve seat, a back pressure chamber having a seat, and a valve proper arranged to close simultaneously on both said seats and exposed to oppositely acting pressures within the first named seat and in the back pressure chamber, respectively, said valve proper including a flexible disk projecting at its outer edge across the seat in said chamber, a clamp securing the central part of said disk and having a flange overlying the outer part of the disk, but spaced apart therefrom, and a dished spring washer confined in such space and bearing on the disk, there being a groove surrounding said seat, and the edge of said disk being extended beyond the seat partly over said groove, and the pressure of said washer being exerted on said extended edge.

6. A compound relief valve comprising a casing having a passage for fluid, a valve proper arranged to close and open said passage, a back pressure chamber into which said valve proper projects and which is in communication with the pressure side of the valve, and a pop valve applied to said chamber for relief of the pressure therein, said valve proper and the chamber having complemental faces arranged to close when the valve is closed, and being otherwise formed to permit escape of fluid during closing movement, whereby to retard seating of the main valve proper after closing of the primary valve.

In testimony whereof I have affixed my signature.

FRANK H. HOPKINS.